D. G. WYMAN.
TOE CALK MACHINE.
APPLICATION FILED MAY 18, 1908.

931,364.

Patented Aug. 17, 1909.
2 SHEETS—SHEET 1.

Witnesses

Inventor
David G. Wyman,
By C. A. Snow & Co.
Attorneys

D. G. WYMAN.
TOE CALK MACHINE.
APPLICATION FILED MAY 18, 1908.
931,364.
Patented Aug. 17, 1909.
2 SHEETS—SHEET 2.
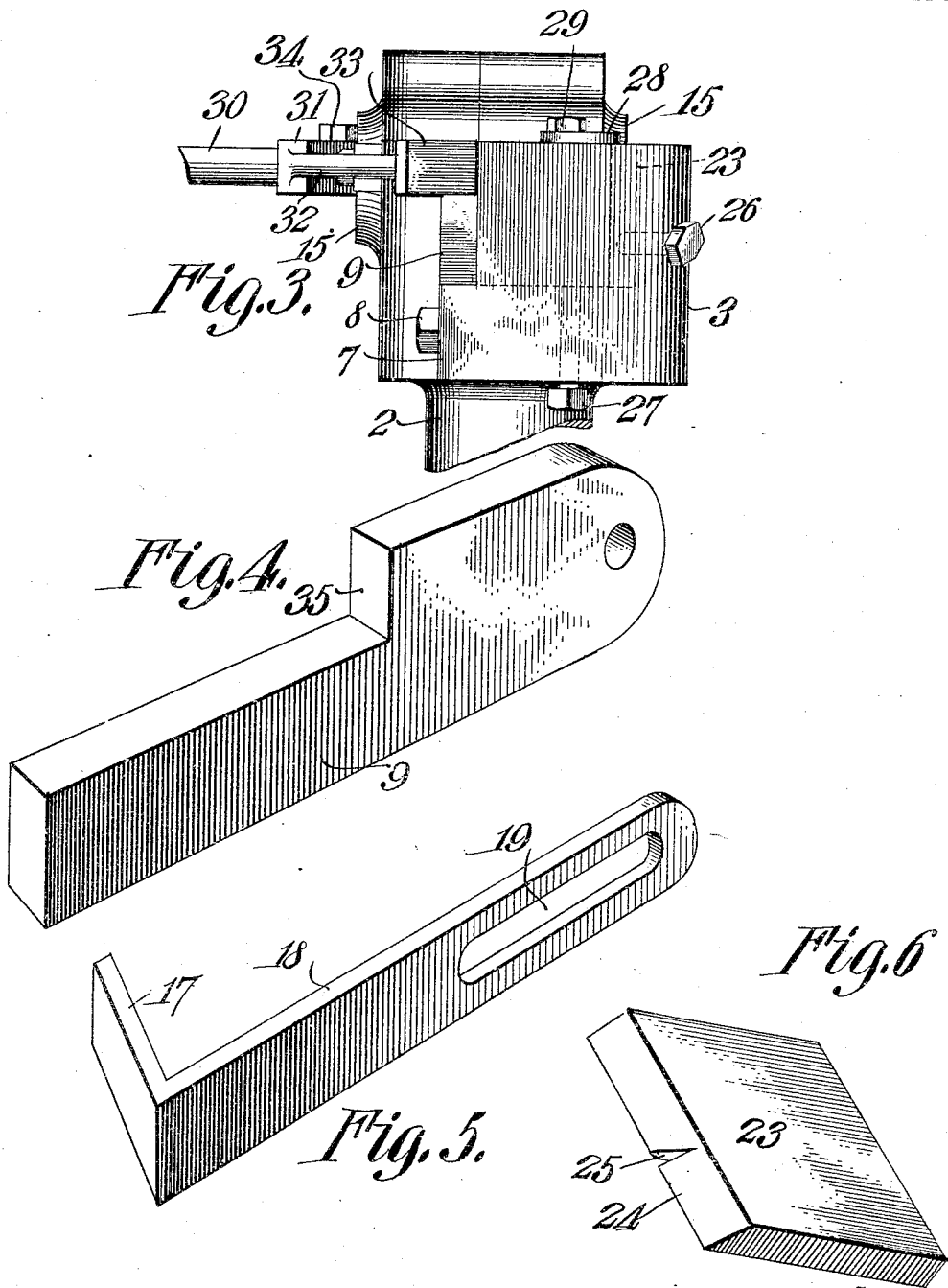
Witnesses
Inventor
David G. Wyman,
By C. A. Snow & Co.
Attorneys

UNITED STATES PATENT OFFICE.

DAVID G. WYMAN, OF ORANGE, MASSACHUSETTS.

TOE-CALK MACHINE.

No. 931,364.　　　　Specification of Letters Patent.　　　Patented Aug. 17, 1909.

Application filed May 18, 1908. Serial No. 433,567.

*To all whom it may concern:*

Be it known that I, DAVID G. WYMAN, a citizen of the United States, residing at Orange, in the county of Franklin and State of Massachusetts, have invented a new and useful Toe-Calk Machine, of which the following is a specification.

This invention has reference to improvements in machines for making toe calks for horseshoes, and its object is to provide a machine for expeditiously producing the calk blanks with a spur at one end, which spur is driven into the heated shoe, and serves to hold the calk in its proper place until the calk and shoe are welded together.

In accordance with the present invention there is provided a machine wherein the die for forming the toe calk and spur is readily removable and is, also, readily adjustable, and means are provided for the ready setting of the machine for the production of calks of any desired size.

The invention will be best understood from a consideration of the following detailed description taken in connection with the accompanying drawings forming a part of this specification, in which drawings:—

Figure 1:
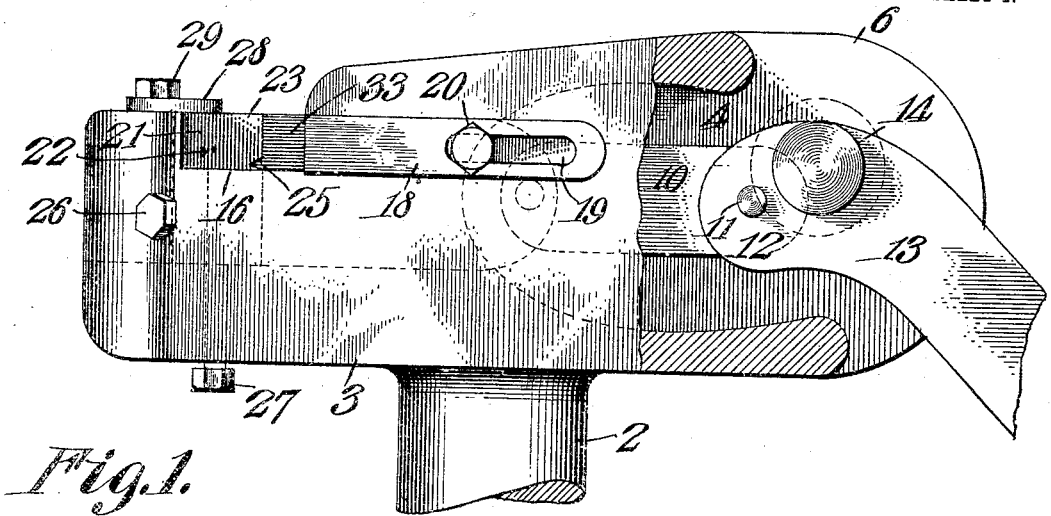
Figure 2:
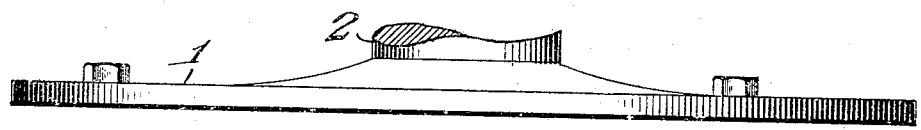
Figure 2:
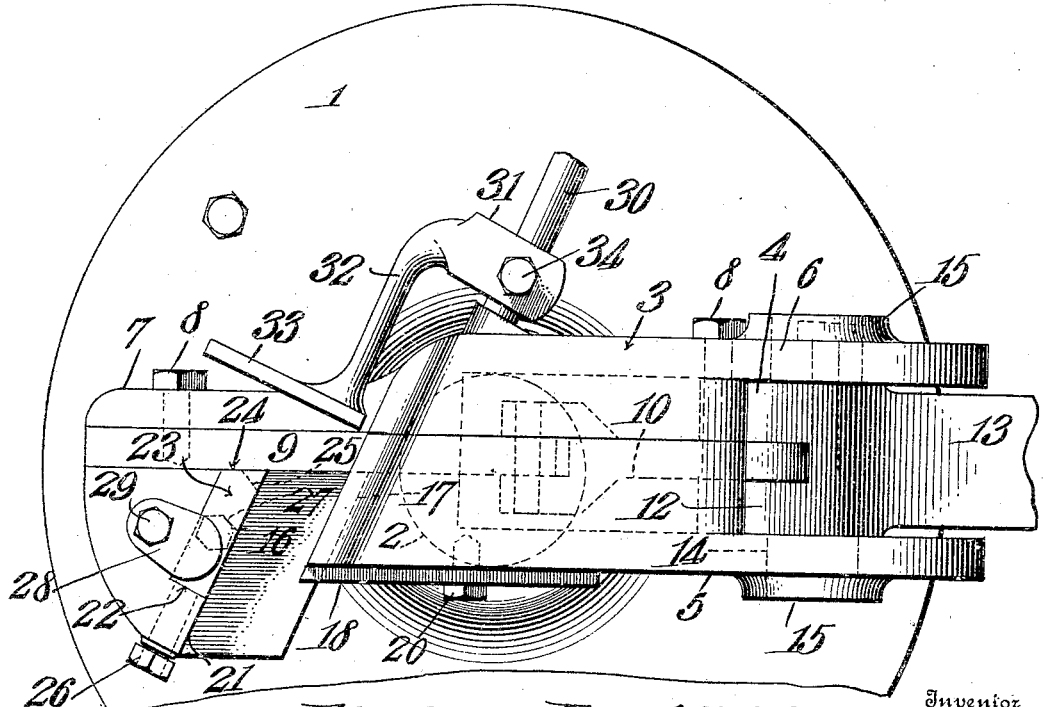

Figure 1 is an elevation, partly in section, of a machine embodying the invention. Fig. 2 is a plan view of the same. Fig. 3 is an elevation from the die end of the machine of a portion thereof. Figs. 4, 5 and 6 are perspective views of details of the machine.

Similar numerals of reference are employed to indicate corresponding parts throughout the several figures of the drawings.

Referring to the drawings, there is shown a stand composed of a base 1, a stem 2, and a body member 3. The body portion 3 is recessed at one end, as indicated at 4, and this recess is closed on one side by a wing 5 forming a continuation of the body portion. Opposed to the wing 5 is another wing 6, spaced therefrom, and constituting the corresponding wall of the recess 4, and this wing is formed on a side plate 7 made fast to the corresponding side of the body portion 3 by suitable screws 8, or otherwise.

Between the side plate 7 and the body portion 3 of the head of the machine is formed a guideway for a shear plate 9, the rear end of which enters the recess 4 and is there connected by a link 10 to a pin 11 in the cam head 12 of an operating lever 13, this lever having formed on opposite sides trunnions 14 entering matched perforations formed in bosses 15 on the wings 5 and 6. By a suitable manipulation of the lever 13, the shear blade 9 is given an appropriate length of travel.

The head 3 on its upper face is recessed to form a table 16 arranged at an angle to the direction of travel of the shear 9, and one wall of this recess is made to overhang to receive the angle arm 17 of a guide 18, which guide is formed with a longitudinal slot 19 for the passage of a screw or bolt 20, by means of which the guide 18 is adjustably secured to the head 3, so that the angle end 17 may be seated under the overhang, or may be removed upon the table 16.

The opposing wall 21 of the recess, the bottom of which constitutes the table 16, has a further recess 22 for the reception of a die 23, and this recess 22 extends downward into the body 3 of the structure. The die is in the general form of a rectangular block with one edge 24 beveled, so that while the body of the block is set at an angle to the line of travel of the shear plate, the bevel edge 24 is parallel thereto, and co-acts with the said shear plate as the stationary member of the shear. At an appropriate point in the bevel edge, the die block is notched, as shown at 25, for a purpose which will presently appear.

The die is adjusted toward the shear plate 9 by means of a suitable set screw 26, and is adjusted with relation to its projection above the table 16 by another set screw 27. The die is also held in its seat in the recess 22 by an eccentric plate 28 held to the body of the structure by a set screw 29, so that on loosening the set screw the plate 28 may be moved into or out of the path of the die to hold the same firmly in place, or to permit its ready removal. By a suitable manipulation of the screws 27 and 29, the vertical adjustment of the die may be accomplished.

Formed on the side plate 7 is a stem 30 receiving a bracket 31 carrying an arm 32, terminating in an abutment 33, so located as to be in line with the table 16. The position of the bracket 31 upon the stem 30 is determined by a set screw 34.

The shear plate 9 is formed with a shoulder 35, which, when the shear plate is in the withdrawn position, is coincident with that side of the table 16 remote from the die 23, and when the lever 13 is manipulated to propel the shear plate forward, this shoulder 35 constitutes the cutting edge of the shear plate co-actively with the die. By setting the guide toward or from the table side of the die 23, strips of various width may be firmly held upon the table 16, and by suitably adjusting the abutment 33 with relation to the active end of the die, the length of material cut from said strip may be determined.

When it is desired to operate the machine, a strip of metal suitably heated is placed upon the table 16, until its end is against the abutment 33. Then the lever 13 is manipulated to force the shoulder 35 of the shear plate 9 toward the die 23, and a section of the strip or bar of metal is thus cut off, and, at the same time, a portion of the main body of the strip is upset into the notch 25. On the next operation of the machine after the shear plate has been withdrawn to its initial position and the hot strip of metal has been again advanced, the next piece sheared off contains a tooth, and so does each succeeding piece cut off from the initial strip. By this means toe calk blanks with the holding tooth may be very expeditiously made. As before stated, the spur or tooth of the calk is for the purpose of holding the calk to the horseshoe preparatory to completing the welding operation, it being understood that the parts are properly heated, so that the calk may be welded to the body of the horseshoe.

By making the head member with a removable side plate, the machine is easily assembled, and the shear plate may be readily removed for sharpening or repairs without dismantling the rest of the machine or disturbing the adjustments. Also, the die block 23 is readily removable for sharpening or replacing without disturbing the adjustments.

What is claimed is:—

1. In a machine for making toe calks, a suitable head or body having a table or support for the material to be treated, a die block at one side of said table, and a movable shear plate traversing the table into operative relation to the die block at a shearing angle thereto.

2. In a machine for making toe calks, a suitable head or body provided with an operating surface or table having a recess extending to one side of and below the surface of the table, a notched die block adapted to said recess, and in operative relation to the table, means for clamping the die block in the recess and means for adjusting the die block as to the relation of the notch therein to the surface of the table both in a direction parallel with the surface of the table and perpendicular thereto.

3. In a machine for making toe calks, a head or body member having a wing formed at one end, a plate secured to said body member and having a wing formed at one end matching, but spaced from the first named wing, a lever mounted between the wings, a reciprocatory shear plate movable in said head or body portion and connected to the lever, and a die having one edge notched, and in shearing relation to the movable shear plate.

4. In a machine for making toe calks, a head or body portion having a recess, the bottom of which constitutes a table for the reception of material to be treated and also having a deepened side extension of said recess, a shear plate mounted in said body portion and traversing the table recess at an angle, a notched die block seated in the deepened recess in shearing relation to the shear plate, a set screw for holding the die block in operative relation to the shear plate, another set screw for adjusting the relation of the notch in the die block to the face of the table, and an eccentric plate and set screw, the plate being arranged to override the die block, and the set screw co-acting with the other set screw for the vertical adjustment of the block to clamp the block in its vertically adjustable positions.

In testimony that I claim the foregoing as my own, I have hereto affixed my signature in the presence of two witnesses.

DAVID G. WYMAN.

Witnesses:
 AMOS E. EMERY,
 PERLEY W. NEWELL.